(12) United States Patent
Kretzschmar et al.

(10) Patent No.: US 7,801,785 B2
(45) Date of Patent: Sep. 21, 2010

(54) HANDLING MULTIPLE CURRENCIES IN A PROJECT MANAGEMENT SYSTEM

(75) Inventors: Lutz S. Kretzschmar, Duvall, WA (US); Eric M. Zenz, Seattle, WA (US); Raymond David Ducolon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 992 days.

(21) Appl. No.: 11/221,002

(22) Filed: Sep. 7, 2005

(65) Prior Publication Data

US 2007/0055590 A1 Mar. 8, 2007

(51) Int. Cl.
*G06Q 40/00* (2006.01)
(52) U.S. Cl. .................... 705/35; 705/26; 705/27; 705/36; 705/37; 705/38; 705/39; 705/40
(58) Field of Classification Search ............... 705/26, 705/27, 35, 36, 37, 38, 39, 40
See application file for complete search history.

(56) References Cited

U.S. PATENT DOCUMENTS

| | | | |
|---|---|---|---|
| 7,003,504 B1* | 2/2006 | Angus et al. | 707/1 |
| 7,024,383 B1* | 4/2006 | Mancini et al. | 705/35 |
| 2003/0014345 A1* | 1/2003 | Lim | 705/36 |
| 2003/0097318 A1* | 5/2003 | Yu et al. | 705/35 |
| 2003/0220795 A1 | 11/2003 | Arayasantiparb et al. | 704/275 |
| 2004/0236664 A1* | 11/2004 | Sellberg et al. | 705/37 |
| 2005/0138013 A1* | 6/2005 | Walker et al. | 707/3 |
| 2006/0004746 A1* | 1/2006 | Angus et al. | 707/4 |

OTHER PUBLICATIONS

Display Multiple Currencies in Project for International Projects:; 2 pages; file://c:\temp\WHPCXBKD.htm; Project 2003 Assistance.
Betsy Smalley, PMP; A Welcom White Paper; "Using Multiple Currencies for Global Project Costing"; 2001; 7 pages.

* cited by examiner

Primary Examiner—Nga B. Nguyen
(74) Attorney, Agent, or Firm—Merchant & Gould (57) ABSTRACT

A project management system is enabled to handle multiple currencies within managed projects. An exchange series includes currency definition parameters such as currency pairing, frequency of rate change, and effective date of exchange rate. Using the exchange series and a strong definition of cost for tasks and resources (i.e. indicating currency type along with value of cost), the project management system allows costs to be entered in local currency. Project level roll-ups are calculated employing time-phased currency conversion based on whether the cost is variable or fixed. For scheduling, speculative conversions are facilitated based on latest actual exchange rate information. Local and project currency costs are provided to a project server for enterprise level roll-ups and multi-project management.

20 Claims, 11 Drawing Sheets

Home  Documents and Lists  Create  Site Settings  Help

Project Site  402

Use this page to set the properties of a currency exchange rate

Currencies 404
Select the currency to convert from. Then select the currency to be converted into.

Convert from this currency:
USD
Convert to this currency:
JPY

406

Exchange Type 408
Select the type associated with this currency exchange

Choose an exchange type:
Quarterly

412

Effective Date
Enter the first date this exchange rate will be effective

Effective date for this rate:
1/1/2004
Enter date in M/D/YYYY format

410

Exchange rate:
106.24

414

OK    Cancel

Fig. 11

HANDLING MULTIPLE CURRENCIES IN A PROJECT MANAGEMENT SYSTEM

BACKGROUND

Project management systems include a number of applications, computing devices, and input devices that schedule, track, and report tasks and resources associated with projects for a variety of organizations. In today's global economy, many enterprises execute projects in various countries, regions, and localities. While some projects may be managed at the local level and results reported to a higher organizational level such as enterprise level, other organizations might prefer to schedule and track projects across countries.

For example, an airline company may have maintenance projects in one country, production projects for its supplies in another, while operational support projects occur in any country that is served by the airline. An enterprise-wide project management system may receive input from executors of tasks associated with the different projects and track their progress as well as cost enabling planners to plan and schedule current and future projects.

SUMMARY

A project management system is enabled to handle multiple currencies within managed projects. Costs for tasks and resources may be entered in a local currency and converted to the project currency based on whether they are variable or fixed. For variable costs, a time-phased cost contour may be employed. Fixed costs may be converted at the beginning of a task, at the end of a task, or prorated.

An exchange series including currency definition parameters such as currency pairing, name of the series, and effective date of exchange rate may be used to provide a user the ability to select between multiple currencies and exchange rates.

Project level roll-ups may be calculated after currency conversion based on exchange rate selection and date is performed, and support a time-phased cost accrual. For scheduling, speculative conversions may be facilitated based on latest actual exchange rate information. Furthermore, costs may be provided in local and/or project currency to a project server for enterprise level roll-ups and multi-project management.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Operating Environment

Figure 1:
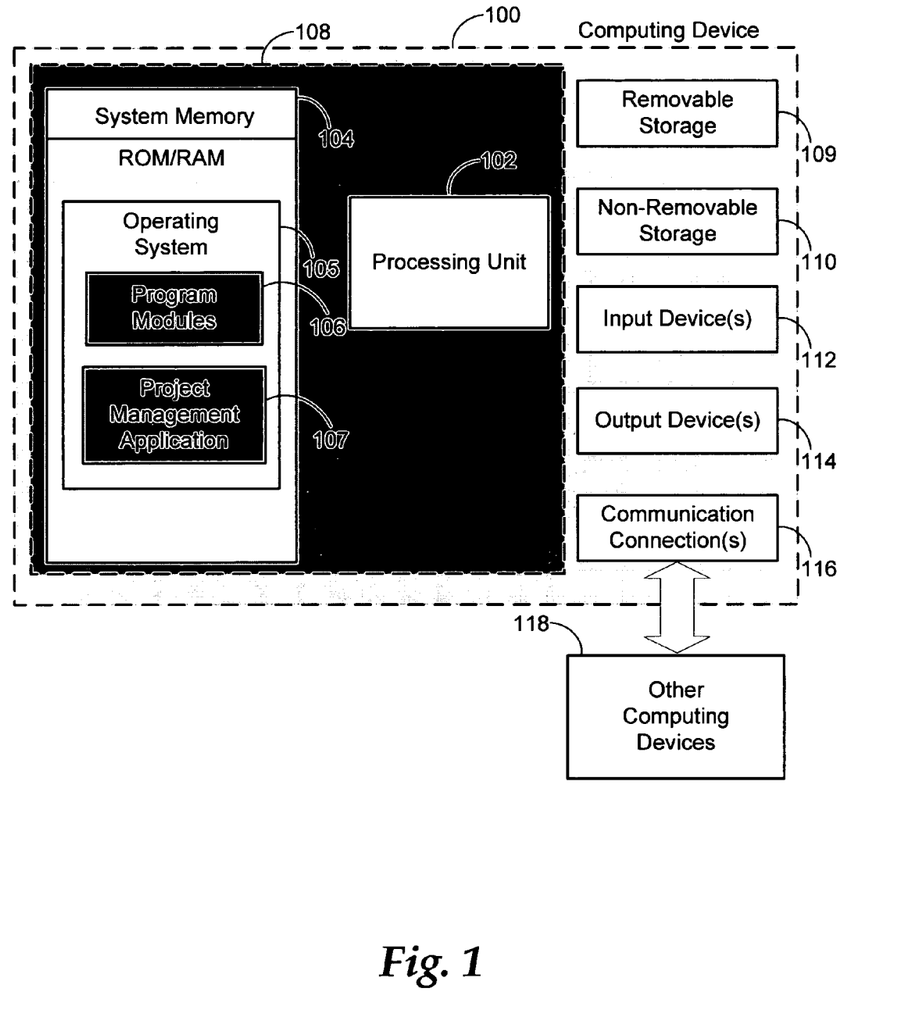
FIG. 1 illustrates a computing device in which a multiple currency project management system according to an example aspect may be executed.

Referring to FIG. 1, an exemplary system for implementing some embodiments includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes operating system 105 and one or more program modules 106 working within operating system 105.

In addition to program modules 106, project management application 107 may also be executed within operating system 105. Project management application 107 may be arranged to schedule, track, and provide various reports of tasks and resources associated with projects.

In one embodiment, project management application 107 may facilitate use of multiple currencies within projects and/or across distinct projects of an enterprise. To perform the actions described above, project management application 107 may interact with other computing devices through communication connection(s) 116.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data.

System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as retail devices, keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Figure 2:
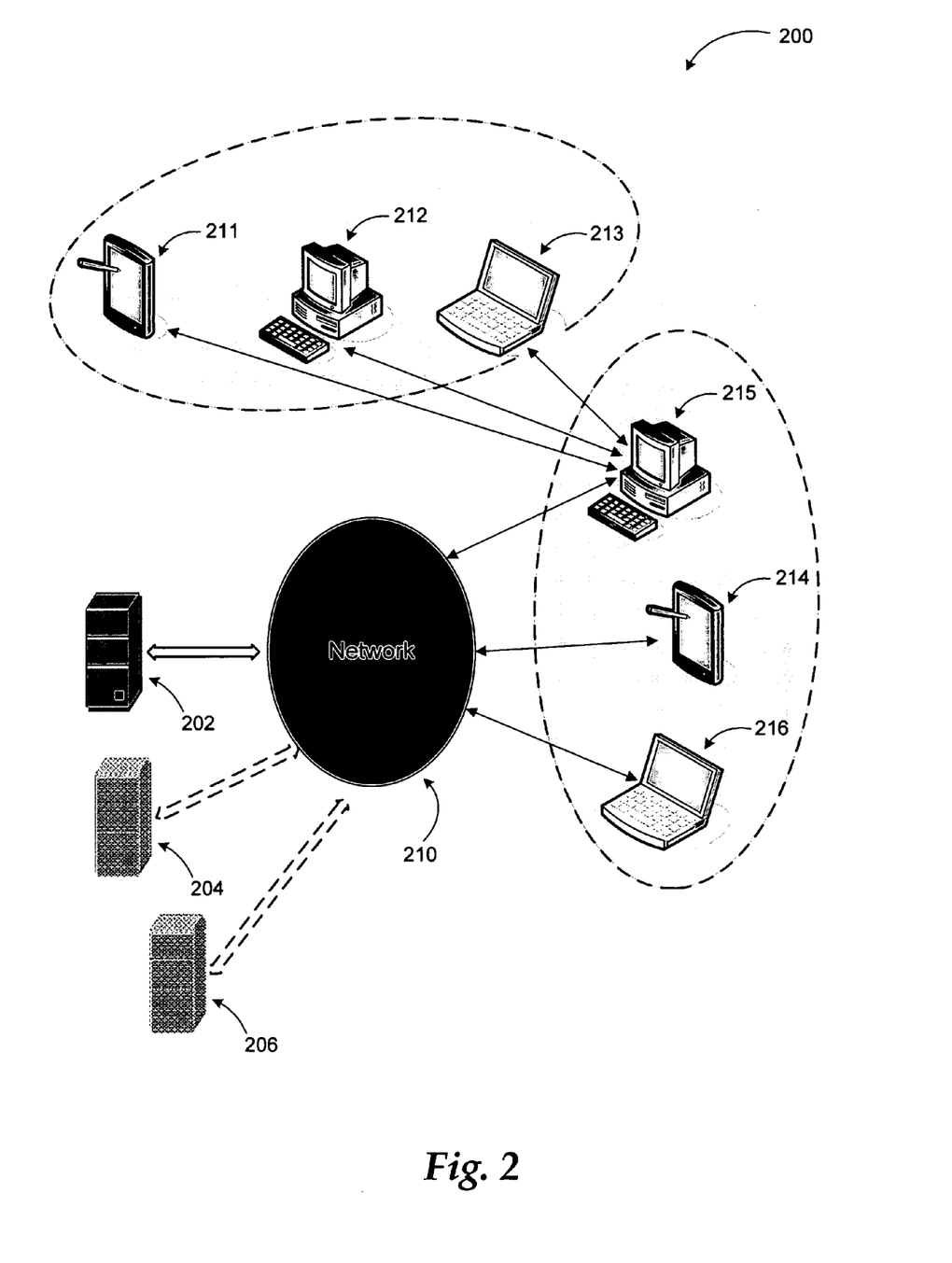
FIG. 2 illustrates an example system, where aspects of a multiple currency project management system may be implemented.

FIG. 2 illustrates example system 200, where aspects of a multiple currency project management system may be implemented. System 200 may include one or more networks that comprise any topology of servers, clients, Internet service providers, and communication media. The networks may also have a static or dynamic topology.

A multiple currency project management application, such as project management application 107 of FIG. 1, may reside on server 202. In one embodiment, the application may be run across distributed servers (e.g. servers 202, 204, 206) in a federated system. Server 202 may include a number of other applications such as accounting applications, database applications, communication applications, and the like.

The project management application may interact with client devices, such as handheld computer 214, desktop computer 215, and laptop computer 216, over network 210 to collect data associated with the project(s), provide reports, and perform other project related tasks. Client devices communicating with server 202 may include any type of computing device, not limited to the examples shown herein.

In another embodiment, one or more clients devices, such as handheld computer 214, desktop computer 215, and laptop computer 216, may each run their own project management application and provide data to server 202 over network 210 for enterprise level project summary reporting.

In a further embodiment, one or more of the client devices may interact with yet other client devices (e.g. computing devices 211 through 213) and receive project related data from those devices over other networks or the same network.

Network 210 may be a secure network such an enterprise network, or an unsecure network such as a wireless open network. Network 210 provides communication between the nodes described above. By way of example, and not limitation, network 210 may include wired media such as a wired network or direct-wired connection, and wireless media such as acoustic, RF, infrared and other wireless media.

The present invention is not limited to the above-described environment, however. Many other configurations of computing devices, communications, applications, and distribution systems may be employed to implement a multiple currency project management application.

Illustrative Embodiments for a Multiple Currency Project Management Application

It may be challenging for multi-national organizations to manage projects in locales with different currencies. If such an organization tries to manage their projects across different locales, their project management system may not be able to handle currency conversions in a useful manner. This may be due to many aspects of project management systems.

A project management system may not account for the actual value of currencies with respect to each other. Costs may simply be variables with decimal numbers within the project application. This may result in customers being unable to see useful reports on costs across projects when projects are entered in more than one currency. For example, an enterprise with two projects managed in U.S. Dollars and Japanese Yen may find summary roll-up of costs in portfolio views useless, as the cost of the Yen project is directly added to the cost of the U.S. Dollar project.

Dealing with costs of tasks within a project in one locale, where the tasks may have costs in different currencies due to their nature. For example, in a project managed in the US, a task may involve a fixed cost accrued Euros, because the task includes services imported from the EU.

Some resources used in the project may not specify their rates in the project currency. For example, a company that hires foreign workers and pays them in their regional currency may not be able to specify the rate in the workers currency but may have to use a manually-converted rate in the project currency.

Embodiments of the present invention are directed to making a project management system aware of monetary currencies. Tasks within a project are allowed to have costs in currencies different than the project currency. Resources in a project are allowed to maintain cost-rates in different currencies. As a result, project-costs in multiple currencies may be managed accurately within a project management application (e.g. Microsoft Project®) and/or on a Project Server installation. A mechanism is provided to convert between currencies based on currency and date, to support a time-phased cost accrual. Furthermore, use of multiple sets (series) of exchange rates between two currencies is supported, enabling customers to choose which type of exchange rate is applicable between currencies.

Figure 3:
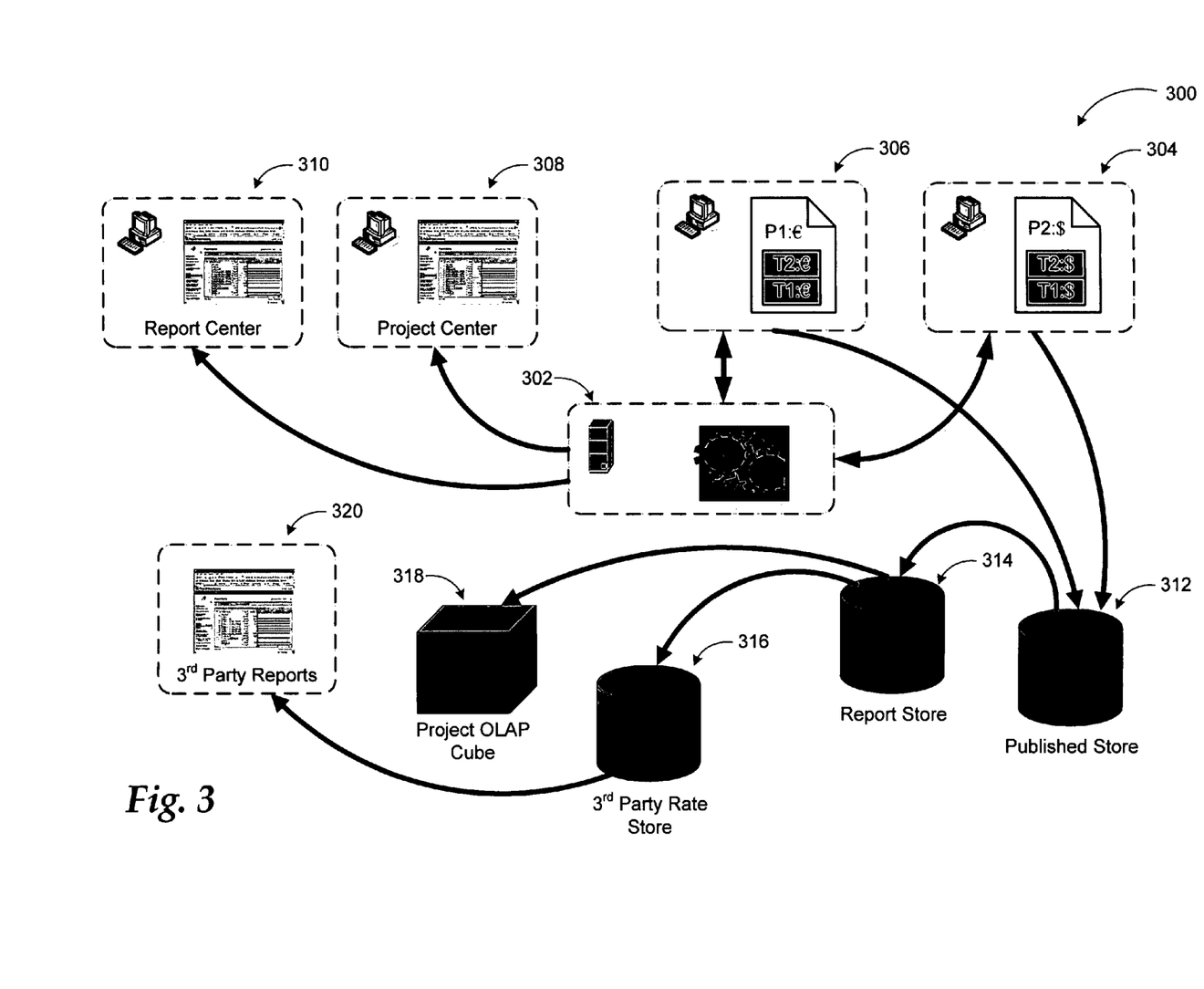
FIG. 3 is a conceptual diagram illustrating an architecture of a project management system using multiple currencies.

FIG. 3 includes conceptual diagram 300 illustrating an architecture of a project management system using multiple currencies.

In the example architecture, individual projects P1 and P2 are managed locally at sites 304 and 306. Sites 304 and 306 may be client devices, client applications running on client devices, client applications running on a central server, and the like. In one embodiment, projects P1 and P2 may be managed partially or completely by project server 302. In another embodiment, client devices 304 and 306 may provide information to project server 302 for project roll-ups and enterprise level management tasks.

In the example, project P1's project currency is Euro. The project currency of P2 is US Dollar. Diagram 300 shows tasks T1 and T2 in each project accruing in their respective currencies, which may not necessarily be the project currency. In one embodiment, individual tasks within the projects may accrue in other currencies. For example, a technology company that has its manufacturing plant in Japan, but design center in the US, may track costs associated with both types of operations in the local currencies until project level roll-up's are performed.

Project reports such as summary task cost calculations, schedules, cost accruals, and the like are published to a Published Store (312), from where they are forwarded to Report Store 314. Published Store 312 stores project and related cost data with strong currency definition (i.e. cost data includes a type information and sufficient decimals associated with the value of the cost in addition to the actual value).

Cost data may be provided from Report Store 314 to third party rate store, which tapped for preparing Third Party Reports 320. In another embodiment, data may be forwarded from Report Store 314 to a multi-dimensional data storage such as On-Line Analytical Processing (OLAP) Cube 318.

Project Center 308 and Report Center 310 are services that are provided by project server 302 or by another system using data provided by project server 302. Project Center 308 and Report Center 310 collect, coordinate, present, and perform other actions associated with project reports such as cost accruals, etc.

Some of the data for multiple currency support in project management applications such as exchange rates may be provided manually by a user, retrieved from a database, or retrieved from an online service (not shown). Retrieval and processing of exchange rates may be performed by project server 302 or locally at projects sites 304 and 306 on a client device.

In one embodiment, the project management system may determine the cost associated with a project task in the local currency, select an applicable conversion rate based on the local currency, the project currency, and the predetermined exchange series. The project management system may then speculate a future conversion rate based on the applicable conversion rate and a scheduled future date associated with the task.

Figure 4:
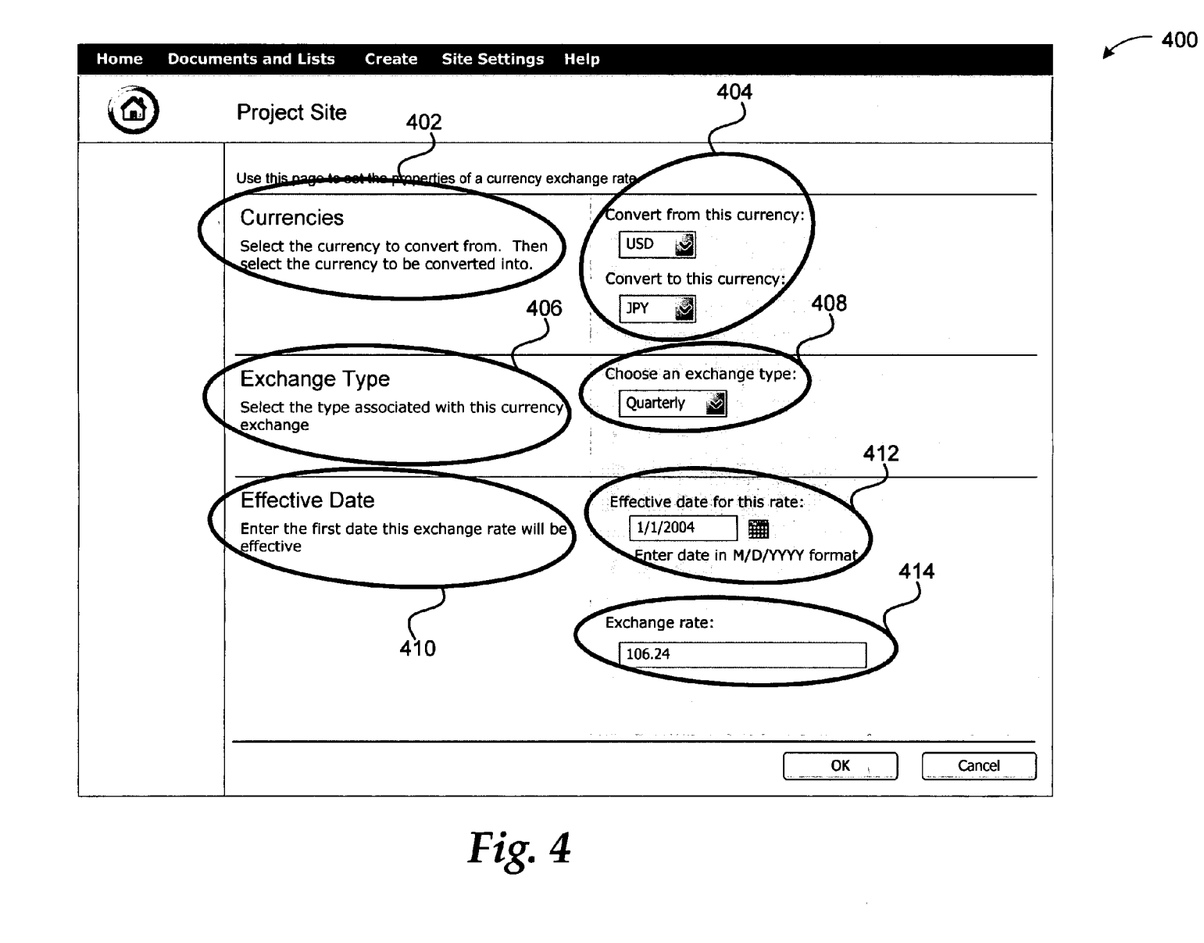
FIG. 4 illustrates a screen shot of a user interface for defining an exchange rate within a multiple currency project management application.

FIG. 4 illustrates screen shot 400 of a user interface for defining an exchange rate within a multiple currency project management application.

Each project is enabled to define a project currency. Calculations performed by the scheduling component of the project management system use this currency to calculate the cost of tasks and assignments within the project. Costs in the project that are specified in a currency other than this project currency are converted to the project currency prior to the calculation.

In one embodiment, the project management system may load and store currency exchange information to facilitate the conversion of costs between currencies. The exchange data for the conversion may include source currency, destination currency, effective date, exchange rate, and type name. This data may be retrieved from a project server or from the stand-alone client application.

The parameters of the exchange data may be defined, in one embodiment, as follows:

The source currency as a three letter ISO-code of the currency being converted

The destination currency as a three letter ISO-code of the currency which the conversion results in The effective date as a date after which this exchange data is valid The exchange rate as a multiplier by which the amount in the source currency is multiplied to get the equivalent amount in the destination currency The type name as the name of an exchange series that this exchange data is defined for The type name enables the project management system to provide more than one exchange rate for any point in time, and together with the currency names, define an exchange series. Using the exchange series provides flexibility to organizations with separate agreements on exchange rates with different partners, as well as full fidelity conversions in transactions with each other. The exchange series provides the ability to convert from one currency to another on any date defined by the series.

As a result, resources may define their currency and series, and rates specified by the resource are in that currency. To enable a scheduler to determine a resource cost, the rates are converted to the project currency using the exchange rate defined by the exchange series, the project currency, and the date of the resources usage.

Screen shot 400 represents a user interface (UI) for setting parameters of the exchange rate in a multiple currency project management application. Currencies portion 402 of the UI prompts a user to enter the source currency and the destination currency. Typically, the destination currency is the project currency itself. However, there may be cases, where multiple conversions may be needed, or reverse conversion to determine costs in local currency. So, the UI is sufficiently flexible to enable both currencies to be determined.

If a project management system simply assigns a variable with decimal value to a cost, not only is the currency information lost, but performing conversions using independent tools may also be difficult especially with large exchange rate variations. For example, currencies such as US Dollar ($) and Euro (€) do not have a significantly different exchange rate. Therefore, they can be converted to each other using a similar variable assigned to the cost.

On the other hand, the exchange rate between some currencies may be relatively high (e.g. Turkish Lira and US Dollar have an exchange rate of 1,400,000). If a user attempts to use the same variable to reflect both currencies and perform the conversion independently, the results may not be useful, due to the high exchange rate.

Accordingly, one embodiment provides for assigning a strong definition to the cost variable that includes the currency type information provided in boxes 404 of the UI.

Exchange type section 406 prompts the user to select from a list of available exchange types. Exchange types define how an exchange rate is to be applied in conjunction with the project. For example, exchange type may define a frequency of an exchange rate update such as daily, monthly, or quarterly (408). The exchange type may also define different exchanges depending on resource and/or task type. For example, a project administrator may use a subsidiary exchange type that uses quarterly updates of exchange rates for tasks involving a subsidiary. At the same time, a spot rate that uses daily exchange rate updates may be applied for tasks involving customers or vendors without a subsidiary relationship.

Effective Date section 410 prompts the user to enter an effective date for the exchange rate to be applied. The effective date, entered in box 412, is used in conjunction with a frequency of updates defined by the exchange type. The exchange rate may also be presented in a textbox (414) in this section and the user given the opportunity to modify it.

The exchange rate may be retrieved from other sources, such as databases, online services, user inputs, and the like, in other embodiments. When performing a conversion, the project management system may determine a most recent effective date and use the exchange rate for that date in the conversion. In a further embodiment, the project management system may determine a closest effective date to the date(s) of the task and use the associated exchange rate.

Time-phased currency conversion, according to one embodiment, is based on an accrual method where each assignment within a task has a cost-contour. Each segment of the cost-contour accrual (daily or fraction of a day) is performed in local currency, then converted to the project currency using the exchange series parameters described above.

For fixed cost tasks, the accrual may be performed at the beginning of the task, at the end of the task, or in a prorated manner. For fixed costs, the conversion may use an effective date that is closest to the accrual date of the cost.

The invention is not limited to these parameters, and other parameters such as issuing agency (country, government, etc.) may be implemented using the principles described herein.

Figure 5:
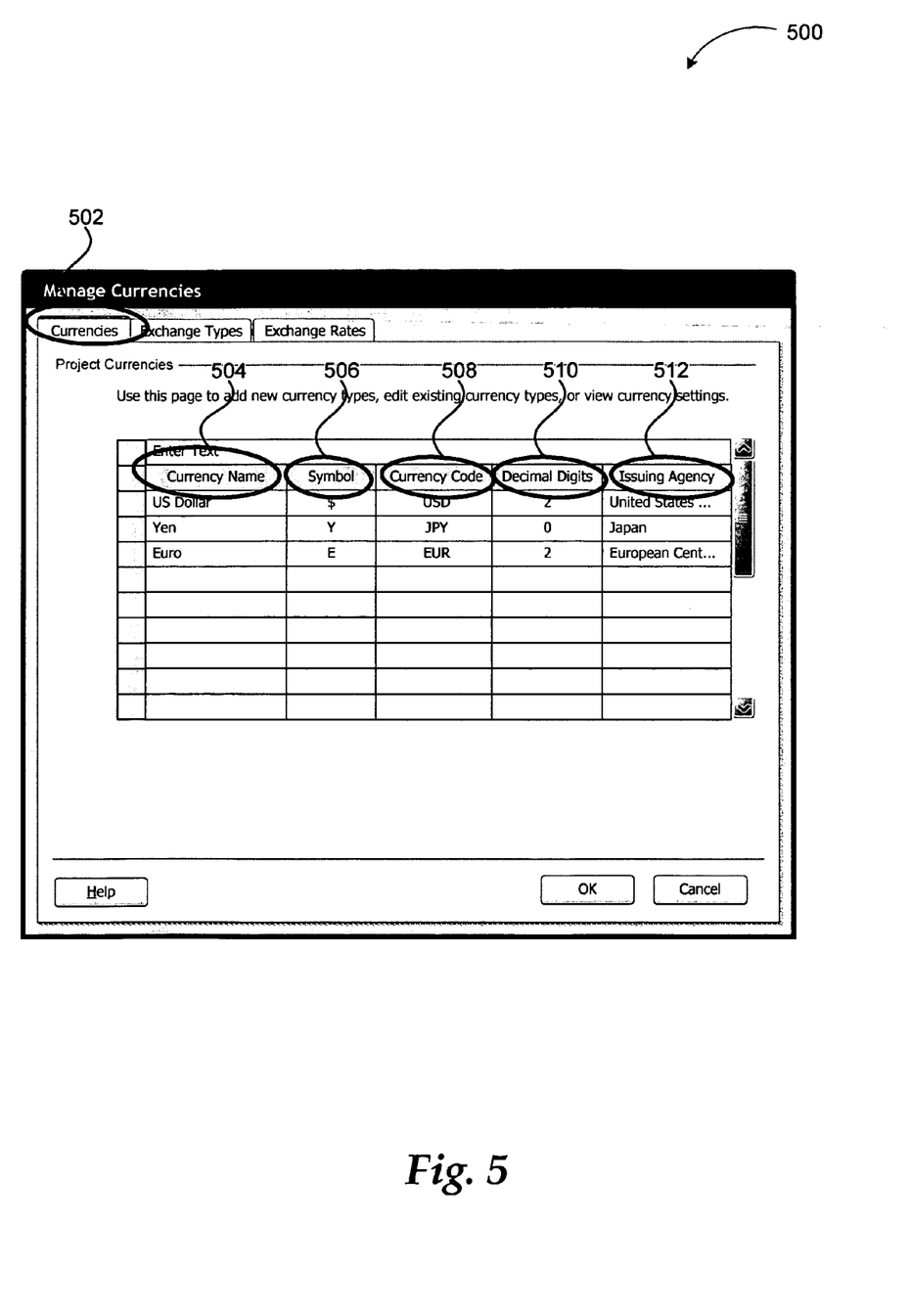
FIG. 5 illustrates a screen shot of currency management portion of the multiple currency project management application of FIG. 4.

FIG. 5 illustrates screen shot 500 of currency management portion of the multiple currency project management application of FIG. 4.

Figure 6:
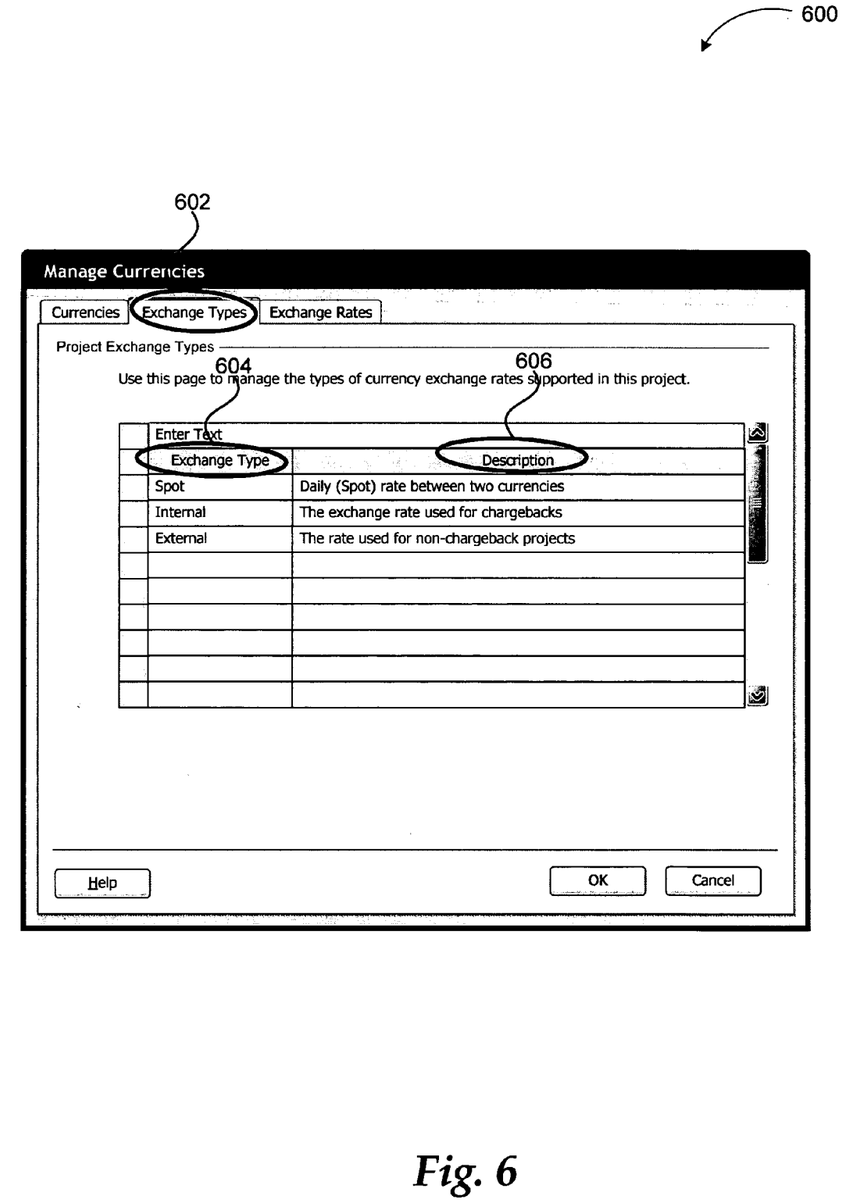
FIG. 6 illustrates a screen shot of exchange types management portion of the multiple currency project management application of FIG. 4.
Figure 7:
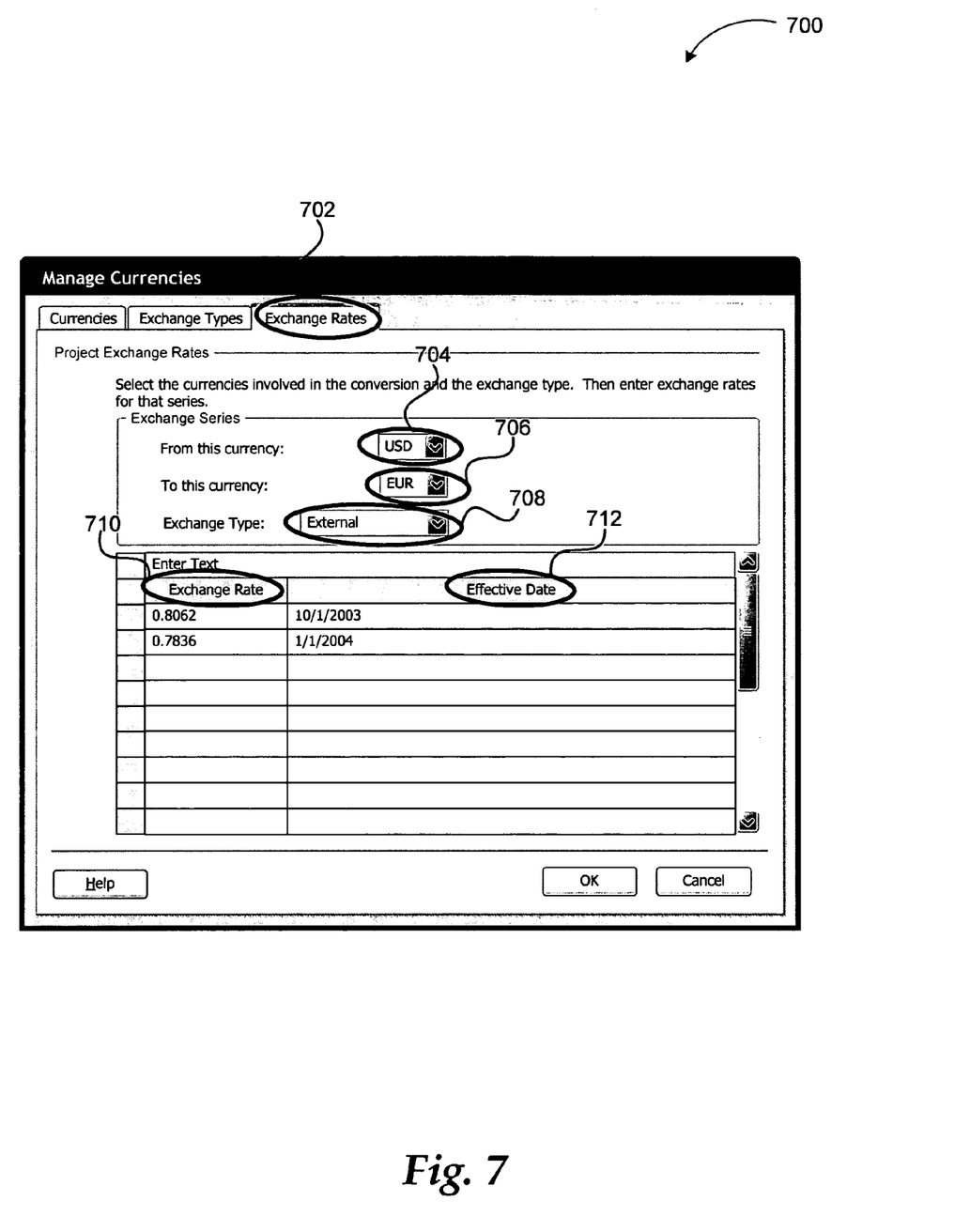
FIG. 7 illustrates a screen shot of exchange rates management portion of the multiple currency project management application of FIG. 8.

Screen shots 500, 600, and 700 of FIGS. 5, 6, and 7 show another UI for managing exchange series that lists parameters associated with multiple exchange series. In screen shot 500 the currency management portion of that UI is shown under "Currencies" tab 502.

Listed parameters include currency name 504, currency symbol 506, currency code 508, decimal digits 510 to be assigned to the currency variable, and issuing agency (country, government, etc.) 512. These parameters are part of the strong definition cost variable in the project management system. They may be used to perform conversions at various levels and present costs in reports, etc.

FIG. 6 illustrates screen shot 600 of exchange types management portion of the multiple currency project management application of FIG. 4.

"Exchange Types" tab 602 is another screen of the UI for management of exchange series. The screen provides available exchange types 604 and their respective descriptions 606 for managing definitions of various exchange types between currencies.

Example exchange types listed on screen shot 600 include spot exchange rate, internal exchange rate, and external exchange rate. A described previously, the spot exchange rate uses daily exchange rate updates. The internal exchange rate is used for charges and chargebacks between parent organizations and subsidiaries. It may include different rates and update periods for intra-organizational transactions.

The external exchange rate is used for non-chargeback projects such as those between a company and its customers, and the like.

Figure 8:
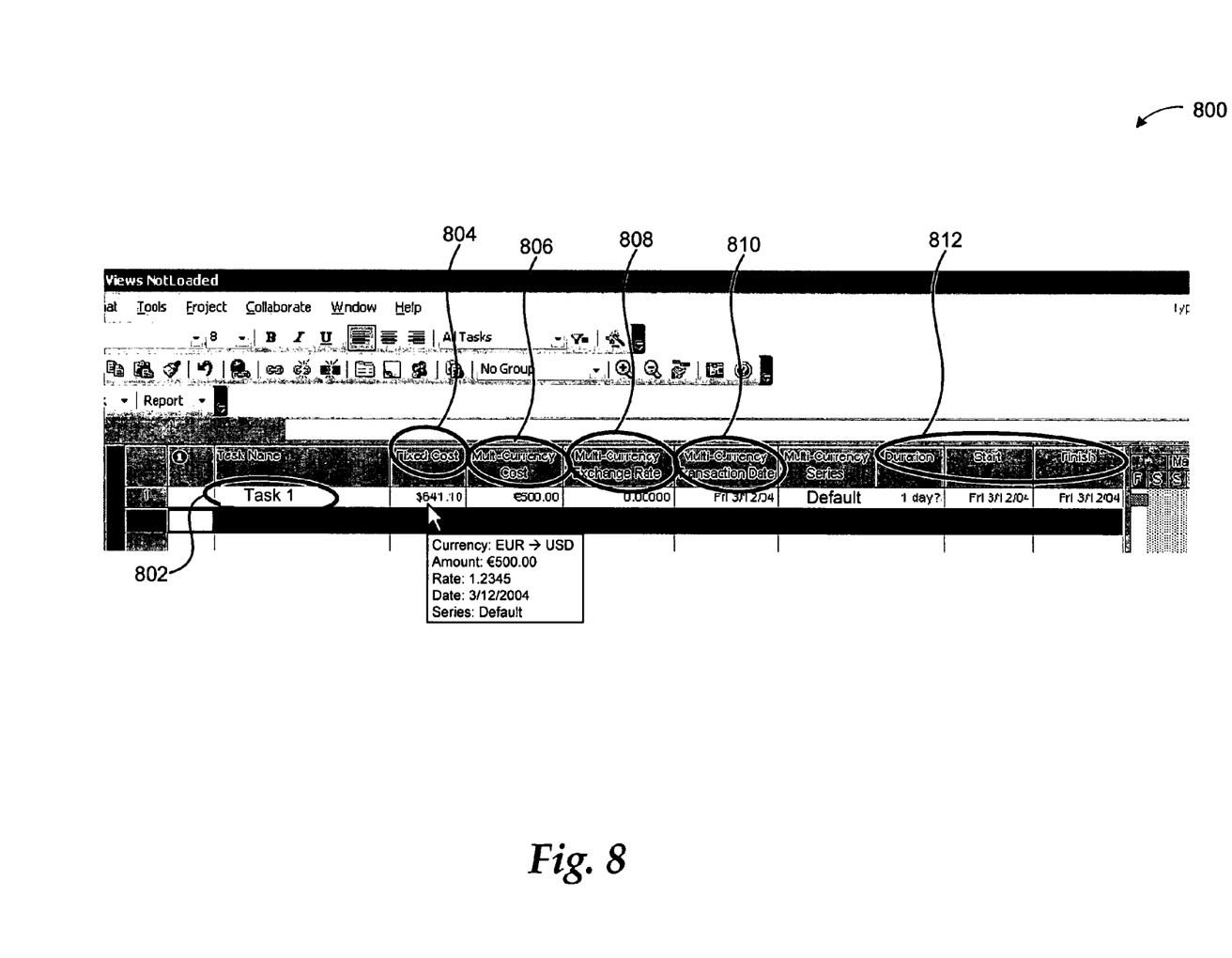
FIG. 8 illustrates a screen shot of a multiple currency project management application showing a listing of tasks.

FIG. 7 illustrates screen shot 700 of exchange rates management portion of the multiple currency project management application of FIG. 8.

Screen shot 700 is the third tab of the exchange series management UI, "Exchange Rates" tab 702. A user, such as a project administrator, may define the source and destination currencies on this screen using drop down menus 704 and 706. The user may further select the applicable exchange type using drop down menu 708. In one example, the exchange types shown by drop down menu 708 are those listed in tab 602 of FIG. 6.

Column 710 of the exchange table in FIG. 7 lists different exchange rate with their effective dates listed in column 712. As explained before, the project management system determines the most accurate rate based on a frequency of update from the exchange type and the effective dates available in column 712. The determined exchange rate is then used to convert local currencies of cost items to project currency.

FIG. 8 illustrates screen shot 800 of a multiple currency project management application showing a listing of tasks.

Project management systems may provide different views of tasks in tabular or graphical format. Screen shot 800 shows a partial table format listing of tasks. As illustrated in the figure, Task1 802 has fixed cost 804 associated with it. The fixed cost is in US Dollars (project currency). Multi-Currency Cost 806 is the local cost for the task with the exchange rate shown in the next column as Multi-Currency Exchange Rate 808. The effective date is listed under Multi-Currency Transaction Date 810.

In this example, a fixed cost is used with default values for exchange series. This is reflected in the "Default" value shown in the Multi-Currency Series column next to Multi-Currency Transaction Date 810.

Following the Multi-Currency Series column are three columns typically associated with tasks in project management systems: duration, start date, and finish date. The values in these columns may also be used in the conversion operation. Depending on which accrual method is selected for the fixed cost resource, the conversion may be performed using the exchange rate as of the finish date, the start date, or a prorated value.

The user interfaces shown in FIGS. 4-8 are for illustration purposes. Similar user interfaces may be implemented in a web application, client application, server application, and the like.

Figure 9:
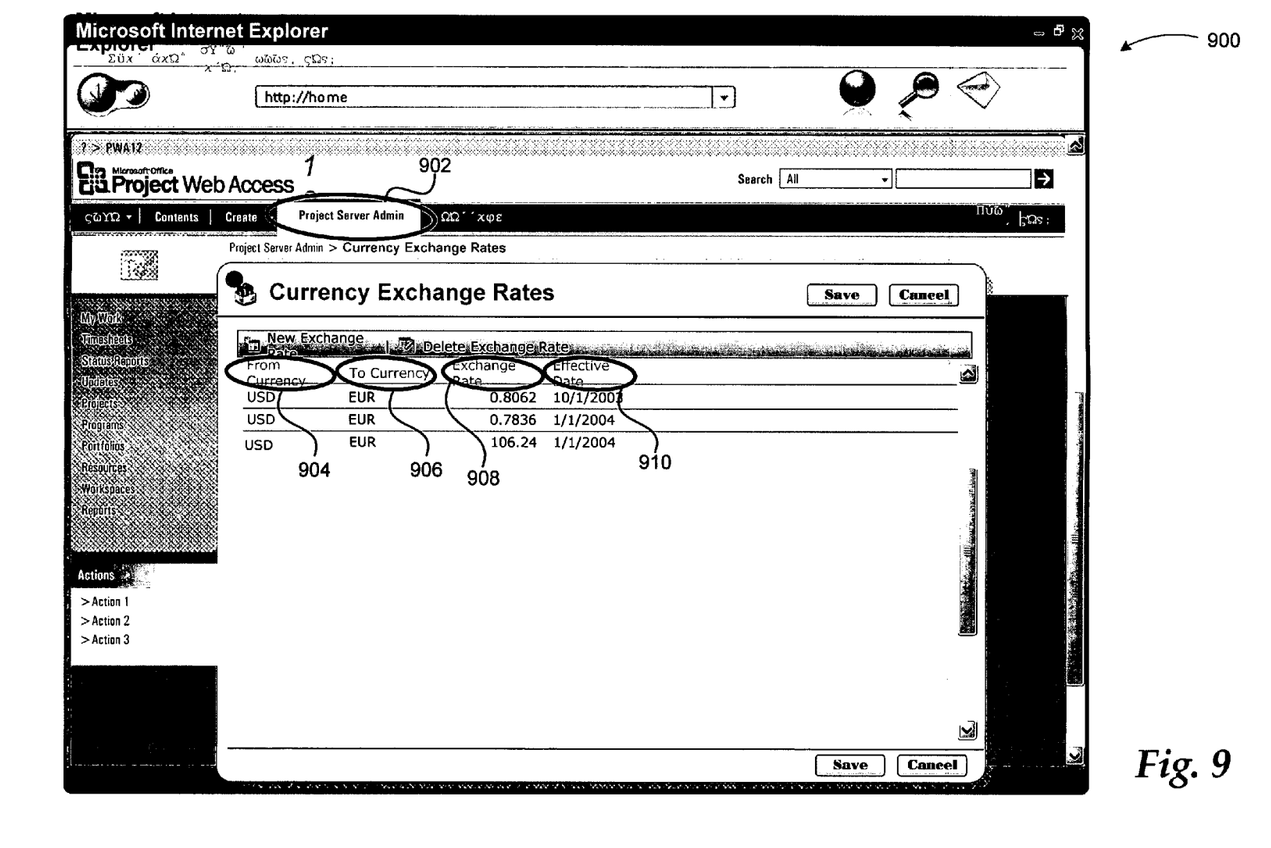
FIG. 9 illustrates a screen shot of project server administration portion of the multiple currency project management application of FIG. 5.

FIG. 9 illustrates screen shot 900 of project server administration portion of a multiple currency project management application.

A project server may interact with client devices and applications, execute project management operations for the client devices and applications, provide reports and data such as exchange rates to the client devices and applications, and the like.

A project server may also collect information from a plurality of locally executed project management applications and manage multiple projects at an enterprise level. In managing multiple projects, the project server may receive project reports in different currencies and convert them to an enterprise currency, or receive reports in a single currency that is different from the enterprise currency, and still convert to the enterprise currency.

By introducing a strong definition of each project's currency, a project server may convert project summary cost data into a single reporting currency. The project server converts project cost information from each project into a common reporting currency.

The project server administration screen (902) shown in the figure includes source currency 904, destination currency 906, exchange rate currency 908, and effective date 910 for enterprise level conversions. Example currencies on screen 902 are all from US Dollars to Euros, but different currencies, exchange rates, and effective dates may be selected for the individual projects that are to be rolled-up into an enterprise report. While this conversion is not time-phased, it does facilitate more-accurate roll-up conversion. In other embodiments, the enterprise level conversion may also be time-phased.

Figure 10:
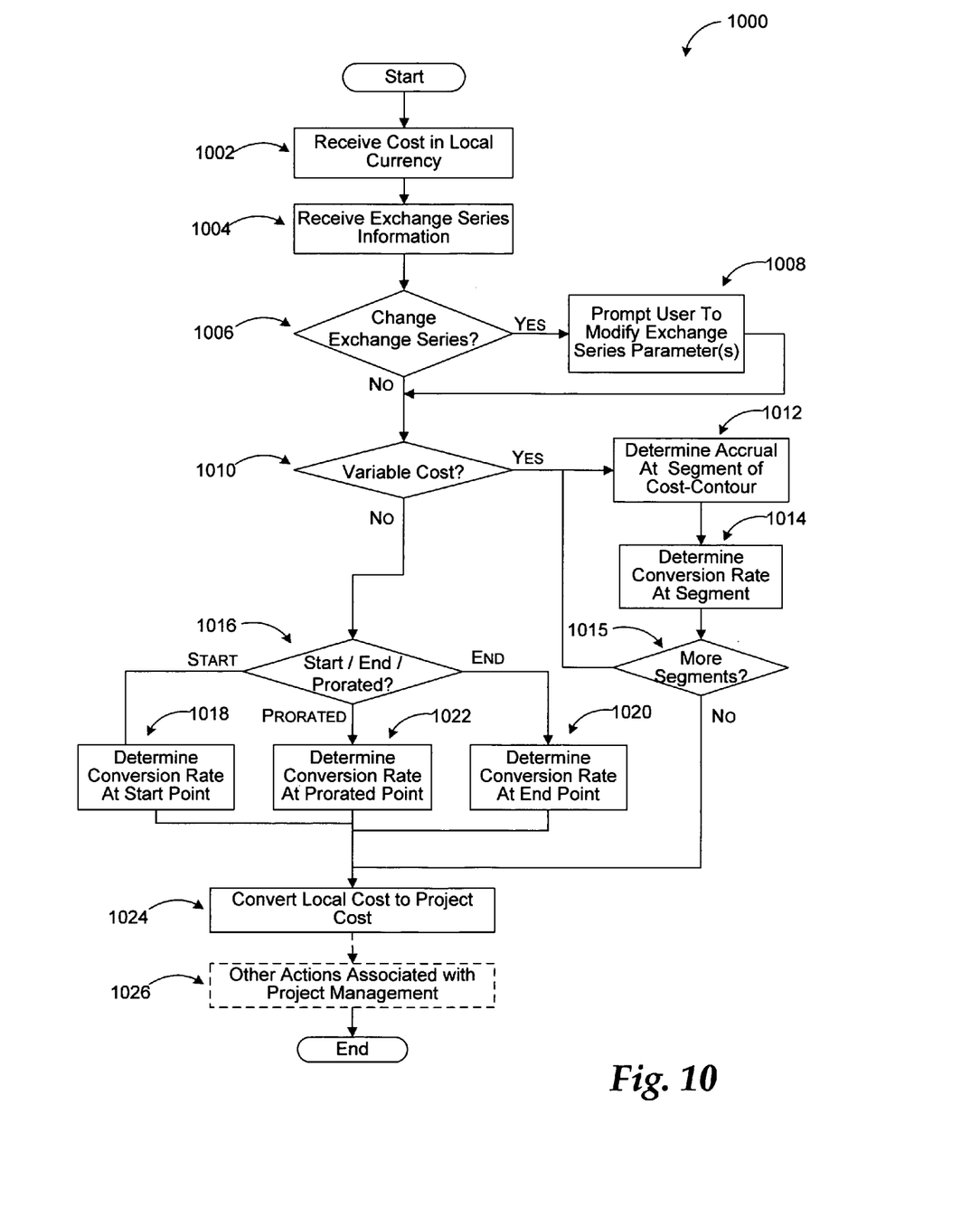
FIG. 10 illustrates a logic flow diagram for a process of managing multiple currencies in a project management system.

FIG. 10 illustrates a logic flow diagram for process 1000 of managing multiple currencies in a project management system.

Process 1000 begins at operation 1002, where a cost associated with a task within a project is received by the project management application. The project management application may be executed in a client device locally, in a project server at enterprise headquarters, and the like. Processing proceeds to operation 1004.

At operation 1004, exchange series information is received. Exchange series information comprises parameters for cost conversion such as exchange rates, exchange types, effective dates, frequency of updates, and the like. As described before, multiple exchange series may be defined for different transactions, but also a default set of parameters may be used when no exchange series is specified. Processing advances to decision operation 1006 from operation 1004.

At decision operation 1006, a determination is made whether one or more parameters of the exchange series are to be changed. If this manual override operation is selected, the user provides exchange rate information. Thus, if the exchange series is to be changed, processing moves to operation 1008, where a user is prompted to modify the parameter(s). Processing then moves to decision operation 1010. If no change is to be made, processing advances to decision operation 1010 directly.

At decision operation 1010, a determination is made whether the cost is variable. If the cost is variable, processing advances to operation 1012. Otherwise, the cost is fixed and processing moves to decision operation 1016.

At operation 1012 a cost accrual at each segment of a cost-contour associated with the task is determined. Time-phased tasks with variable cost have cost-contours defined in project management systems. In one embodiment, cost accruals are converted at each segment of the cost-contour. Accordingly, a conversion rate based on the selected exchange series parameters is determined at operation 1014 following operation 1012. Processing then proceeds to decision operation 1015.

At decision operation 1015, a determination is made whether there are additional segments to be processed. If there are more segments, processing returns to operation 1012 for determining the cost accrual of another segment. Otherwise, processing continues to operation 1024.

At decision operation 1016, a determination is made whether the fixed cost is to be converted at the beginning of the task, at the end of the task, or prorated to another time point along the task. If the beginning is to be used, processing moves to operation 1018, where the conversion rate is determined based on the selected exchange series parameters and processing advances to operation 1024.

If the end of the task is to be used for conversion of the fixed cost, the conversion rate is determined at operation 1020 based on the selected exchange series parameters at that time point and processing advances to operation 1024. If a prorated point is to be used, the conversion rate is determined at operation 1022 for the prorated point and processing advances to operation 1024.

At operation 1024, the local currency cost is converted to the project levels cost using the conversion rate determined in one of operations 1014, 1018, 1020, and 1022. Processing then moves to optional operation 1026.

At optional operation 1026, other actions associated with project management are performed. Such actions may include, but are not limited to, preparing a cost report based on the converted costs, publishing a report to a data store, providing a report to a project server, and the like.

After optional operation 1026, processing moves to a calling process for further actions.

Figure 11:
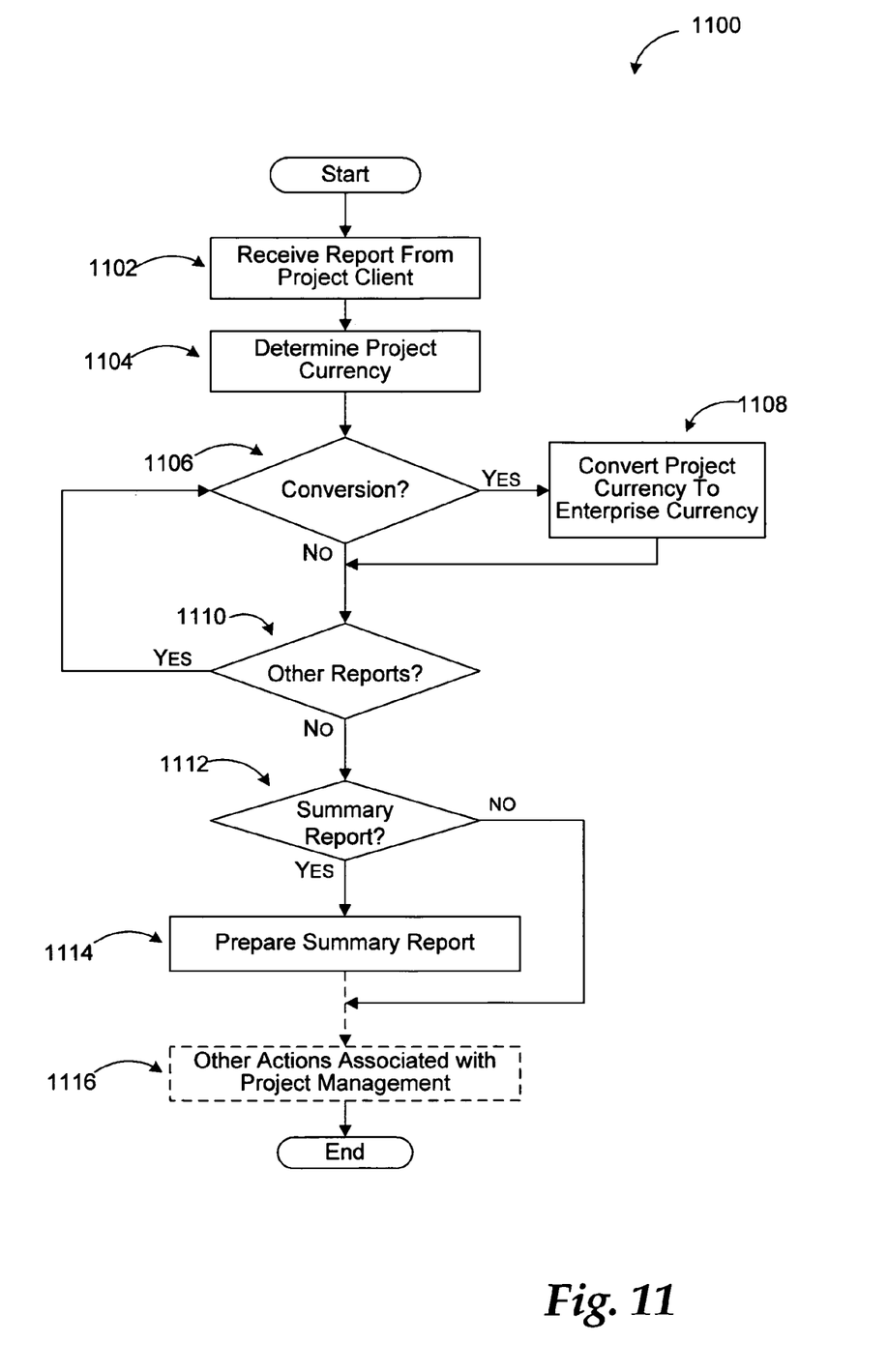
FIG. 11 illustrates a logic flow diagram for another process of managing multiple currencies by a project server in a project management system.

FIG. 11 illustrates a logic flow diagram for process 1100 of managing multiple currencies by a project server in a project management system.

Process 1100 begins at operation 1102, where a project plan is received from a client device or application running a project management application. The project report may be based on multiple local currencies that have been converted to a project currency as described above. Processing moves from operation 1102 to operation 1104.

At operation 1104, the project server determines the project currency used in the report. In some embodiments, the project server may interact with multiple project clients and receive a plurality of plans using different project currencies. In other embodiments, multiple project servers may share enterprise level project management and work with a single enterprise level currency that may be different from some of the project level currencies. Processing moves from operation 1104 to decision operation 1106.

At operation 1106, a determination is made whether currency conversion is needed for the received project report. If conversion is needed, processing advances to operation 1108. If conversion is not needed, processing moves to decision operation 1110.

At operation 1108, the report is converted from project currency to enterprise currency. While this conversion is not time-phased, it may facilitate more-accurate roll-up conversion using exchange series parameters. Processing moves from operation 1108 to decision operation 1110.

At decision operation 1110, a determination is made whether additional reports are received. In some embodiments, the project server may be tasked with providing summary reports based on multiple project reports. If the determination is affirmative, processing returns to operation 1106. Otherwise, processing advances to decision operation 1112.

At decision operation 1112, a determination is made whether a summary report is to be prepared. If a summary report is requested, processing moves to operation 1114. Otherwise, processing skips operation 1114 and advances to optional operation 1116.

At operation 1114, a summary report is prepared based on converted costs from different project reports. Processing moves from operation 1114 to operation 1116.

At optional operation 1116, other actions associated with project management are performed. Such actions may include, but are not limited to, publishing the report to a data store, analyzing report results, interacting with other applications, and the like.

After optional operation 1116, processing moves to a calling process for further actions.

The operations included in processes 1000 and 1100 are for illustration purposes. Managing multiple currencies in a project management system may be implemented by a similar process with fewer or additional steps.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for managing multiple currencies within a project management system, the method comprising:

determining a time-phased cost associated with a project task in a local currency, the task being associated with a cost-contour, wherein determining the time-phased cost comprises determining the time-phased cost as a variable cost;

selecting an applicable conversion rate based on the local currency, a project currency, and a predetermined exchange series comprising an exchange rate, an exchange type, and an effective date, wherein selecting the applicable conversion rate comprises setting conversion parameters including a source currency parameter, a destination currency parameter, the exchange type, and the effective date, wherein setting the conversion parameters including the exchange type and the effective date comprises defining a frequency of updating the exchange rate and defining the effective date for the exchange rate to be applied; and converting, by a computer, the local currency of the time-phased cost to the project currency using the applicable conversion rate, wherein converting the local currency of the time-phased cost to the project currency using the applicable conversion rate comprises converting an accrual of the cost in the local currency to the project currency at each segment of the cost-contour associated with the task.

2. The computer-implemented method of claim 1, further comprising providing a report based on a roll-up of costs associated with selected tasks within a project using the project currency.

3. The computer-implemented method of claim 2, further comprising providing the report to at least one of a Report Store, a project server, and a third party store.

4. The computer-implemented method of claim 1, wherein determining the time-phased cost further comprises determining the time-phased cost as a fixed cost.

5. The computer-implemented method of claim 4, further comprising converting the cost in the local currency to the project currency at one of a beginning point of the task, an end point of the task, and a prorated point of the task, if the cost is fixed.

6. The computer-implemented method of claim 1, further comprising a string defining a project cost within the project management system and including at least one of a currency name, a currency symbol, a currency code, a number of assigned decimal digits, and a name of an issuing agency.

7. The computer-implemented method of claim 1, further comprising employing the exchange type to determine the exchange rate based on a transaction type, and the exchange type includes one of spot type for daily exchange rate updates, an internal type for chargeback transactions, and an external type for non-chargeback transactions.

8. The computer-implemented method of claim 1, wherein defining the frequency of updating the exchange rate comprises defining the frequency of updating the exchange rate from a list of available exchange types comprising daily, monthly and quarterly updates.

9. The computer-implemented method of claim 8, wherein selecting the exchange series comprising the exchange rate updates comprises selecting the exchange series comprising the exchange rate updates provided by at least one of a user input, a database, and an online service.

10. The computer-implemented method of claim 8, further comprising arranging the effective date to determine a beginning of each period of the exchange rate updates as specified by the frequency of exchange rate updates.

11. The computer-implemented method of claim 10, further comprising using the effective date closet to a conversion date to determine the conversion rate for converting the local currency to the project currency.

12. A computer-readable medium having a set of instructions which when executed perform a method for managing multiple currencies in a project management system, the method executed by the set of instructions comprising:

determining a cost associated with a project task in a local currency, the project task being associated with a cost-contour with each segment of the cost-contour configured to be accrued for currency conversion;

selecting an applicable conversion rate based on the local currency, a project currency, and a predetermined exchange series comprising an exchange rate, an exchange type, and an effective date, wherein selecting the applicable conversion rate comprises setting conversion parameters including a source currency parameter, a destination currency parameter, the exchange type, and the effective date from a user interface component of the project management system, the user interface component of the project management system enabling a user to define a frequency of updating the exchange rate and the effective date for the exchange rate to be applied;

speculating a future conversion rate based on the applicable conversion rate and a scheduled future date associated with the task; and converting the local currency of the cost to the project currency using the speculated future conversion rate.

13. The computer-readable medium of claim 12, wherein selecting the predetermined exchange series further includes selecting the predetermined exchange series comprising the frequency of updating the exchange rate, and wherein the effective date is arranged to determine a beginning of each period of the exchange rate updates as specified by the frequency.

14. The computer-readable medium of claim 13, wherein speculating the conversion rate for converting the local currency to the project currency comprises speculating the conversation rate using at least a most recent effective date.

15. The computer-readable medium of claim 12, wherein the instructions further comprise providing a user an opportunity to override the speculated future conversion rate.

16. A system for integrating multiple currency conversion into a project scheduling and costing engine, the system comprising:

a client terminal comprising a project client configured to:

determine a cost associated with a project task in a local currency, the cost being a variable cost and the project task being associated with a cost-contour with each segment of the cost-contour configured to be accrued for currency conversion, select an applicable conversion rate based on the local currency, a project currency, and a predetermined exchange series comprising an exchange rate, an exchange type, a frequency of updating the exchange rate, and an effective date, used in conjunction the frequency of updating the exchange rate, for defining a time for the exchange rate to be applied, wherein selecting the applicable conversion rate comprises setting conversion parameters including a source currency parameter, a destination currency parameter, the exchange type, and the effective date from a user interface component of the project management system, wherein the user interface component enables a user to define the frequency of updating the exchange rate from a list of available exchange types comprising daily, monthly and quarterly updates, convert an accrual of the variable cost in the local currency to the project currency at each segment of the cost-contour associated with the project task, using the applicable conversion rate, and provide a report based on a roll-up of costs associated with selected tasks within a project using the project currency; and a server terminal comprising a project server having a memory storage and a processing unit coupled to the memory storage, the project server being configured to:

receive the report from the project client, and manage consumption of the report by at least one of an analysis application, a publishing application, and a scheduling application.

17. The system of claim 16, wherein the project server is further configured to provide project client data including at least one of the exchange rate, the exchange type, the frequency, and the effective date.

18. The system of claim 16, wherein the project server is further configured to receive reports from a plurality of project clients, convert project currencies of the reports to an enterprise currency, and provide a multiple project report.

19. The system of claim 16, further comprising at least one additional project server, wherein the project server and the at least one additional project server manage projects within an enterprise in a shared manner.

20. The system of claim 16, further comprising a data store configured to store at least one of the report, and data associated with the exchange rate, the exchange type, and the effective date.

* * * * *